Figure 1:
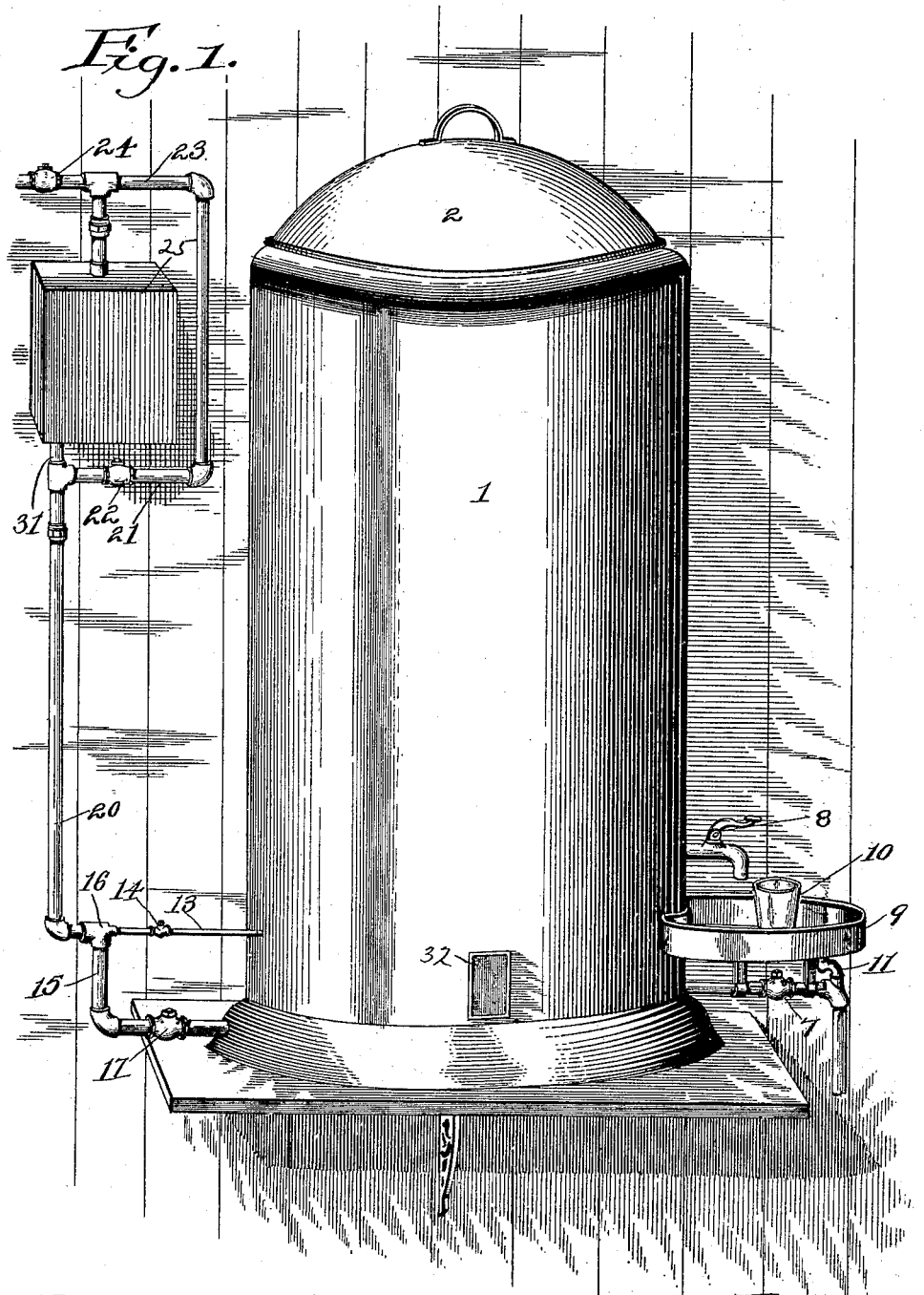

No. 652,443. Patented June 26, 1900.
G. G. SCHROEDER.
FILTER.
(Application filed Oct. 5, 1898.)
(No Model.) 6 Sheets—Sheet 1.

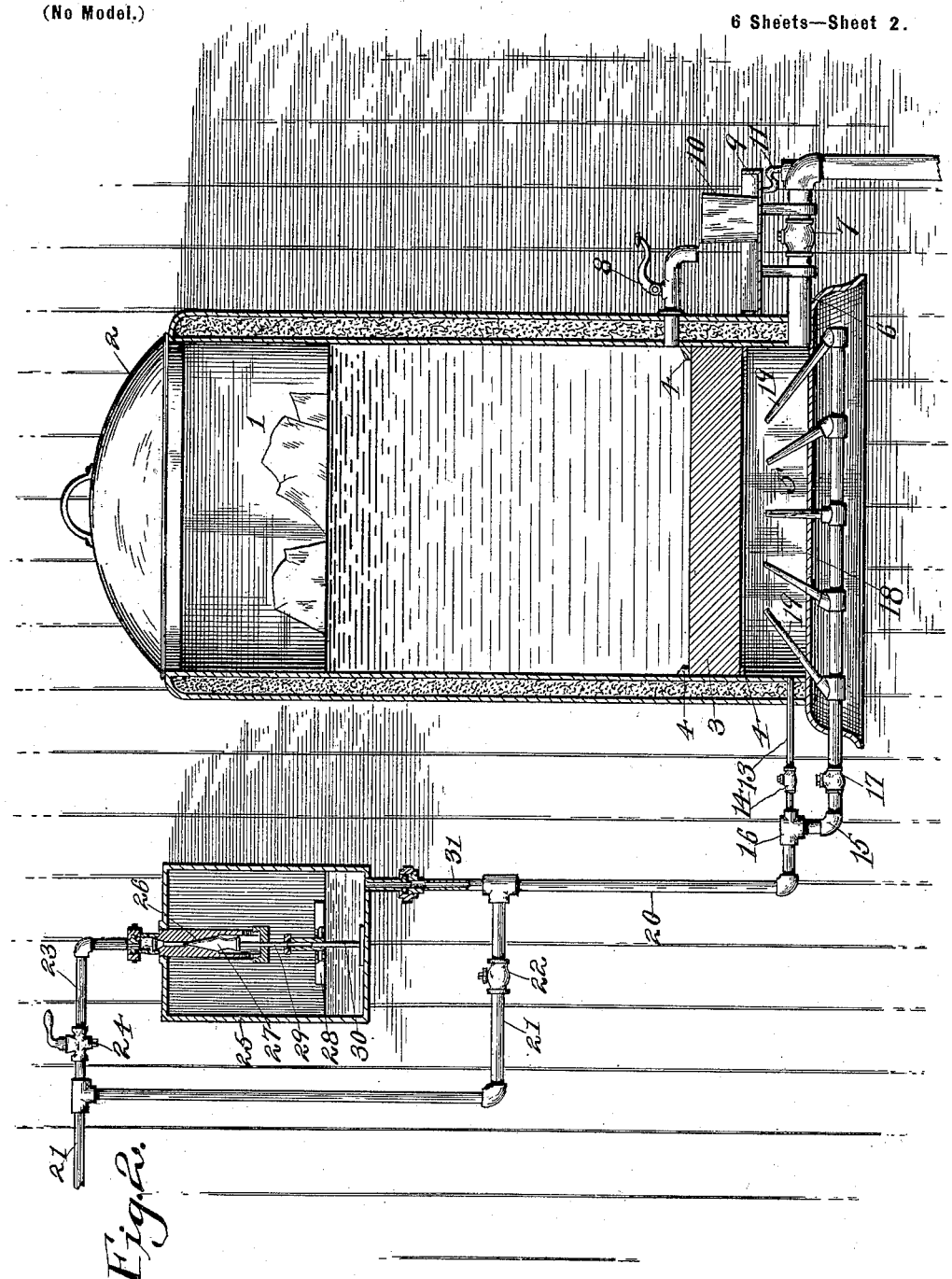

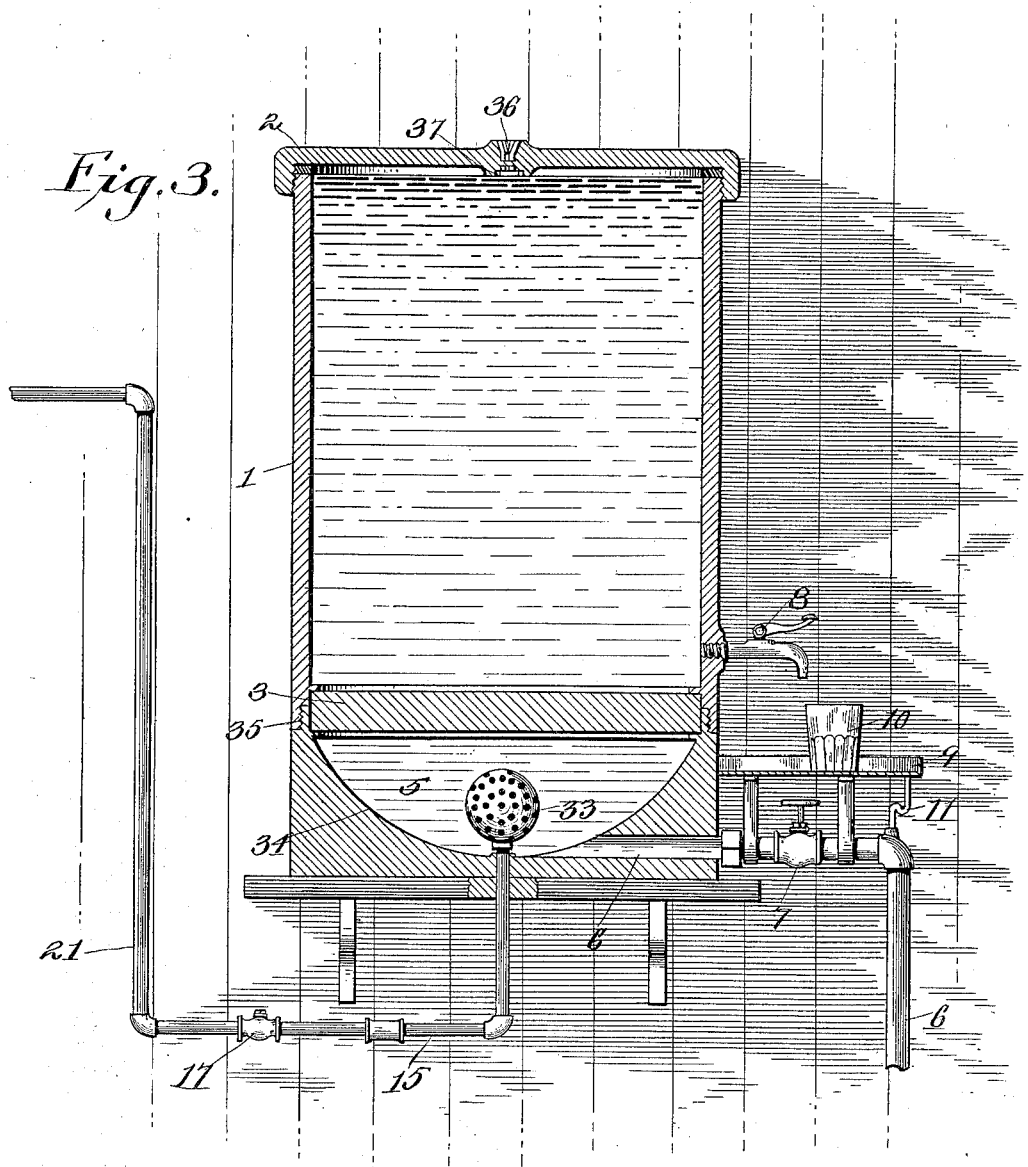

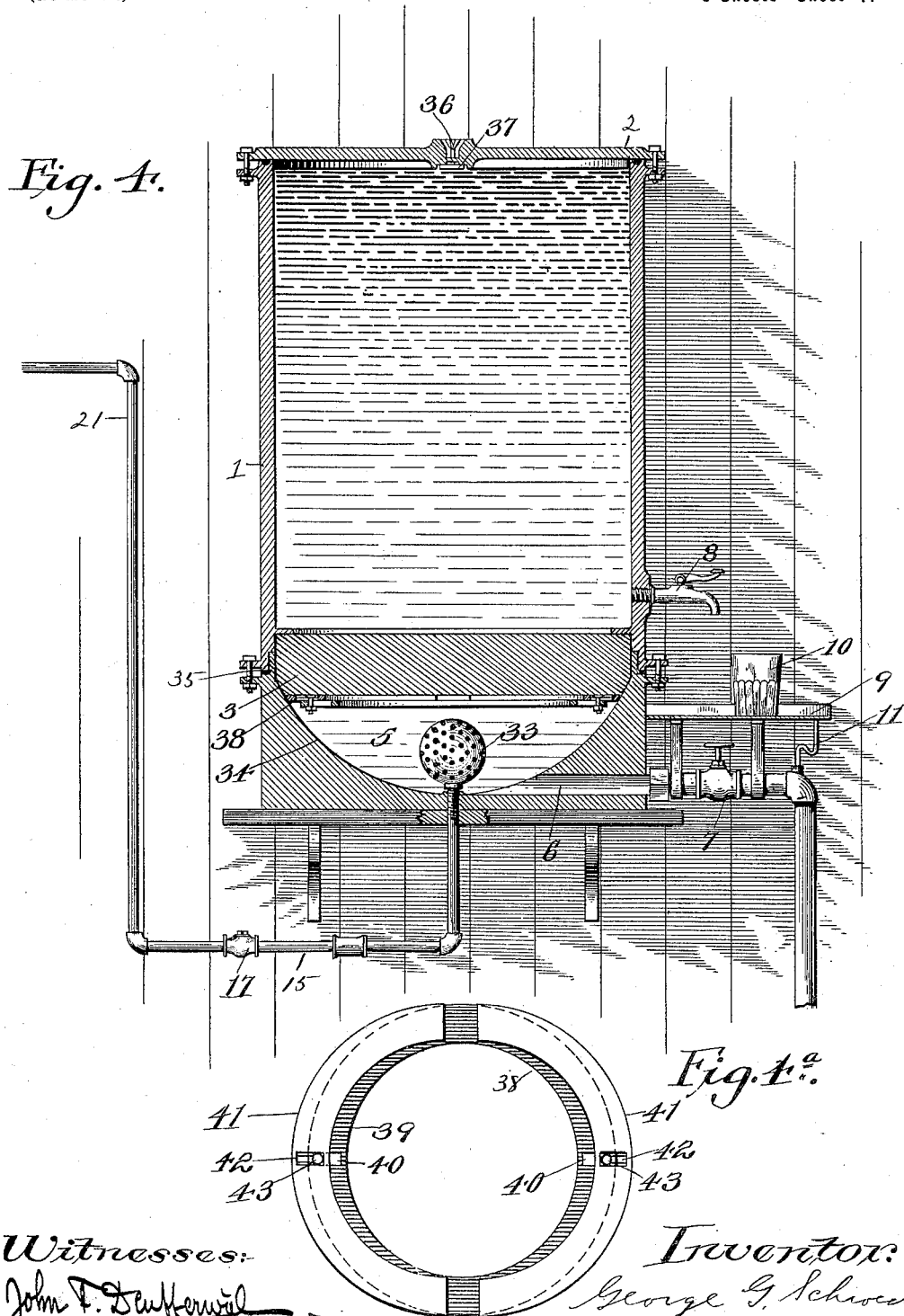

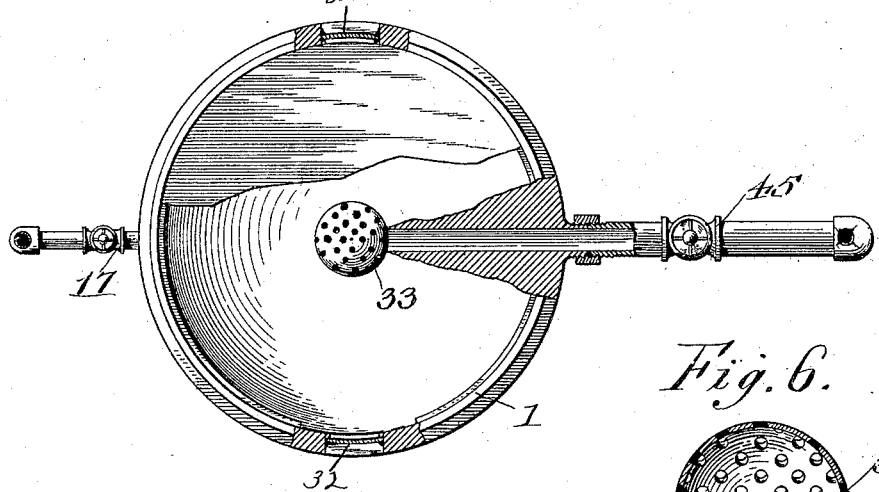
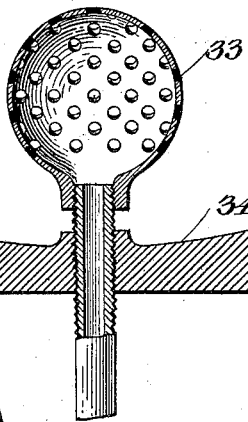
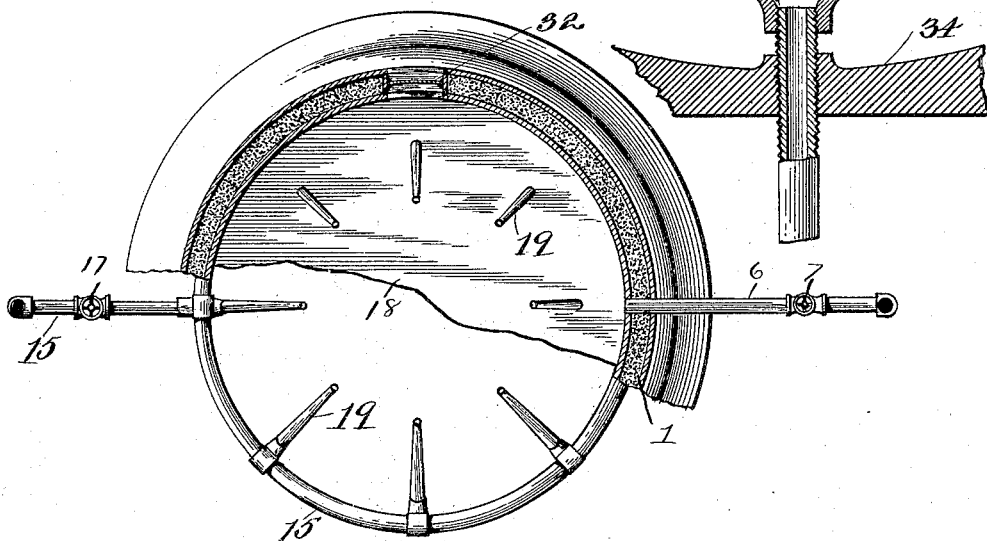

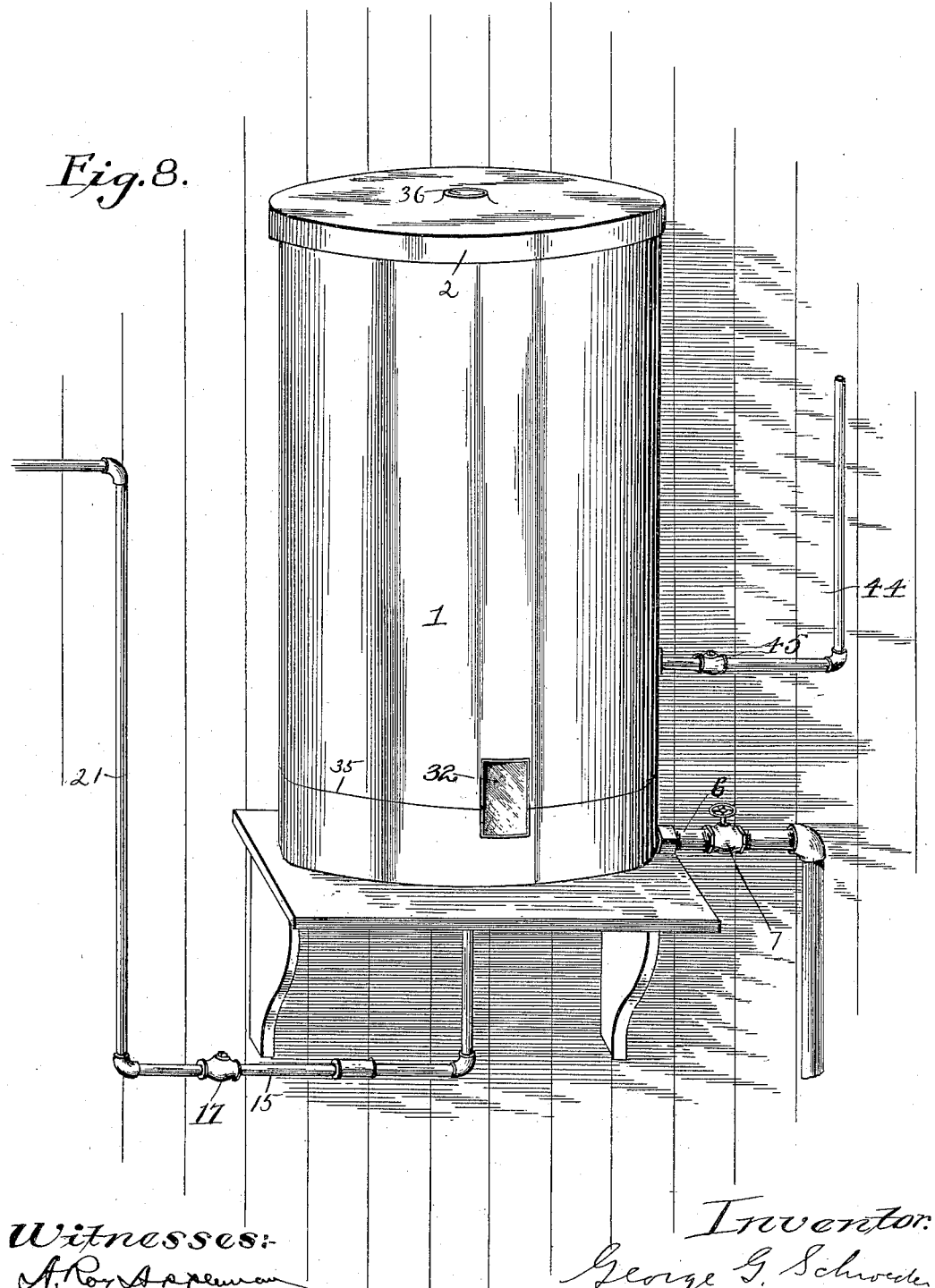

UNITED STATES PATENT OFFICE.

GEORGE G. SCHROEDER, OF BALTIMORE, MARYLAND, ASSIGNOR OF ONE-HALF TO BEAUREGARD J. LANDRY, OF PAINCOURTVILLE, LOUISIANA.

FILTER.

SPECIFICATION forming part of Letters Patent No. 652,443, dated June 26, 1900.

Application filed October 5, 1898. Serial No. 692,764. (No model.)

*To all whom it may concern:*

Be it known that I, GEORGE G. SCHROEDER, a citizen of the United States, residing at Baltimore, in the State of Maryland, have invented certain new and useful Improvements in Filters; and I do hereby declare the following to be a full, clear, and exact description of the invention, such as will enable others skilled in the art to which it appertains to make and use the same.

My invention has relation to filters; and it consists in the novel construction and arrangement of its parts, as hereinafter described.

The object of the invention is to provide a filter adapted to filter water to be used in steam-boilers or other generators. The device in either form is provided with a suitable efficient means for automatically cleaning the stone used in the process of filtration. The cleaning of the stone is done by injecting fine jets of water against the under side of the stone. At the same time suitable valves connected with the waste-pipe are open, and as the waste-pipe is of greater capacity than the inlet-pipe the water is exhausted much quicker, and the fine jets of water coming in contact with the lower face of the stone remove the sediment from the stone, the sediment having been collected thereon during the process of filtration. At the same time the weight of the water above the stone assists in removing the sediment from the lower face of the stone.

In the accompanying drawings, Figure 1 is a perspective view of a filter used for drinking purposes, said filter being adapted to contain ice. Fig. 2 is a transverse sectional view of the filter as shown in Fig. 1, the said figure also showing a suitable means for regulating the height of the water within the filter. Fig. 3 is a sectional view of the filter, showing a modified form of the cleaning mechanism. Fig. 4 is a transverse sectional view of a filter, showing a supporting means adapted to adjust itself to different thickness of stone. Fig. 4ª is a plan view of the adjustable support. Fig. 5 is a horizontal sectional view of the lower portion of the filter, showing the cleaning mechanism as shown in Figs. 3 and 4. Fig. 6 is a transverse sectional view of a perforated bulb used in the form of the invention as shown in Figs. 3, 4, and 5. Fig. 7 is a horizontal sectional view of the cleaning mechanism as shown in Fig. 2, and Fig. 8 is a perspective view of a filter adapted especially to be used in clarifying water for steam-boilers or other steam-generators.

In the form of the invention as shown in Figs. 1 and 2 the receptacle 1 is substantially the same in construction as the ordinary water-cooler, and said receptacle being provided with a removable top or cover 2. The stone 3 is located in the lower portion of the receptacle 1, said stone being firmly held in place by the offsets or flanges 4 4. The stone 3 extending horizontally across the lower faces of the receptacle 1 forms in the bottom thereof the compartment 5. The waste-pipe 6 connects with said compartment 5, the said waste-pipe being provided with the valve 7. The ordinary spigot 8 is connected with the interior of the receptacle 1 above the stone 3, and just below the spigot 8 the tray 9, adapted to support a glass or other drinking vessel 10, is located. The drip-pipe 11 at its upper end extends through the bottom of the tray 9, the lower end of the said drip-pipe being connected to the waste-pipe 6. The drip-pipe 11 is provided at an intermediate point with the elbow or gooseneck, as shown in Figs. 1, 2, and 3, forming a liquid seal in the said pipe, thus preventing any sewer-gas from coming up through the waste-pipe 6 and discharging from the tray 9 into the air. The inner end of the supply-pipe 13 enters the compartment 5. Said supply-pipe 13 is provided with a valve 14, and it will be observed that the capacity of the pipe 13 is much less than the capacity of the exhaust-pipe 6. The pipe 15 connects with the supply-pipe 13 at the point 16, the pipe 15 being provided with the valve 17, the said pipe 15 passing under the bottom 18 of the receptacle 1, the said pipe 15 having a number of slanting or inclined reducing-nozzles 19. The nozzles 19 extend through the bottom 18 of the receptacle 1 at an acute angle to the lower surface of the stone 3.

Fig. 7 gives a top plan view showing the arrangement of the nozzles 19 and showing their location upon the pipe 15. By referring to Fig. 7 it will be observed that the pipe 15 under the bottom 18 is made in circular form and that the nozzles 19 are arranged on said circular section, and thus it will be observed that jets of water may be thrown from the ends of the nozzles 19 at an angle against the under surface of the stone 3, the said jets coming substantially from all directions and removing the sediment collected on the lower face of the stone 3, as will be hereinafter explained. The combined capacity of the pipes 13 and 15 is less than the capacity of the waste-pipe 6, the object of which will be hereinafter described. The pipe 20 connects with the pipes 13 and 15 at a point 16 and extends upwardly, where it is connected to a supply-pipe 21, containing a valve 22. A pipe 23, containing a valve 24, connects the upper end of the supply-pipe 21 with the top of the chamber 25. At the lower end of the pipe 23 the valve-seat 26 is located, and the valve proper, 27, is adapted to come in contact with said seat, and thus shut off the supply of water. A float 28 is connected to the valve-stem 29, said float being guided by the rod 30, passing through a suitable perforation in the plate 28. Said rod 30 is supported on the bottom of the compartment 25. The pipe 31 enters at its upper end the bottom of the compartment 25 and is connected with the pipe 20, as shown in Fig. 2.

Having thus described the construction of the form of the invention as shown in Figs. 1, 2, and 7, I will now describe the operation.

It is supposed that the lower surface of the stone 3 is perfectly clean, the valve 7 is shut off, the valve 17 is closed, the valve 14 is opened, the valve 22 is closed, and the valve 24 is opened. Thus the water enters through pipe 21, passes through valve 24, thence through pipe 23 and through the valve-seat 26 into the compartment 25. The water then descends through pipe 31, enters pipe 20 and passes therethrough, and thence through valve 14 and pipe 13 into the compartment 5. The valve 7 of the waste-pipe 6 being closed the water rises in the compartment 5 and comes in contact with the lower face of the stone 3. The water then percolates through the said stone 3, leaving on the under face of the stone the sediment. The clear water then enters the upper portion of the receptacle 1, as illustrated in Fig. 2. The cap or cover 2 may be readily removed, and ice may be placed in the interior of the receptacle 1. The water thus filtered may be drawn off at the faucet 8 in a suitable vessel and used either for drinking or cooking purposes. Any drip or overflow from the faucet 8 will pass down through the pipe 11 into the waste-pipe 6. When the water within the receptacle 1 assumes a desired level, the water within the compartment 25 is at the same level, and thus the float 28 is lifted, and the said float, by means of the stem 29, lifts the valve 27 and brings it in contact with the valve-seat 26. Thus the supply of water is automatically cut off, and the water may be maintained at a desired level within the receptacle 1. As the water is drawn from the receptacle 1 the float 28 falls and more water is let in past the valve 27. However, the said valve automatically closes, as above described, when the water again assumes the proper level. When it is necessary to clean the under face of the stone 3, the valve 14 is closed, the valve 17 is opened and the valve 7 is also opened, the valve 22 is opened, and the valve 24 is closed. Thus the water comes in through the pipe 21, passes through valve 22, enters pipe 20, from thence passes through a pipe 15, through valve 17, and passes out at the ends of the reducing-nozzles 19. The said nozzles throw jets of water forcibly against the under face of the stone, and said jets coming substantially from all directions has a tendency to loosen the sediment on the under face of the stone. At the same time the capacity of the pipe 6 being greater than the capacity of the pipe 15 the water thus introduced is more rapidly exhausted than it is let in, and hence the water in the compartment 5 is quickly exhausted, thus leaving the water within the upper portion of the receptacle 1 supported by the stone 3. This water will immediately begin to percolate down through the stone, and thus the weight of water from above bearing down upon the sediment collected on the under face of the stone will also have a tendency to loosen the sediment, and the jets coming at an angle against the sediment will thoroughly clean the under face of the stone. The sediment and water then pass out through the waste-pipe 6 into the sewer. The transparent section 32 is provided in the lower portion of the receptacle 1, and through said section 32 it is possible to see into the interior of the compartment 5, and thus during the process of cleaning it can be readily seen when the water ceases to be muddy, and then it is known for a certainty that the lower face of the stone is clean.

In the form of the invention as shown in Figs. 3, 4, 5, 6, and 8 the means for introducing the water into the compartment 5 is modified. The pipe 15 is connected directly to the supply-pipe 21, the said pipe 15 having the valve 17, the inner end of said pipe 15 passing up through the bottom of the receptacle 1 and being provided on its end with the perforated globe 33. The bottom 34 of the compartment 5 is concaved. The upper portion of the receptacle 1 is made independently of the lower portion of the said receptacle, the two said parts being joined together at the point 35, any suitable joint being made at this point. By thus joining the parts together the stone 3 can first be located in position in the base of the receptacle 1, and then the upper portion of the said receptacle is joined to the base. The cover 2 is screw-threaded or otherwise permanently attached to the upper end of the receptacle 1. Said cover 2 is provided with the valved vent 36, the valve of the said vent having a float 37. Thus before the level of the water within the receptacle 1 approaches the vicinity of the cover 2 the said vent 36 is opened and the air can escape therethrough as the water rises. However, when the water comes in contact with the float 37 the said float is elevated and the vent 36 is closed, and thus the water cannot pass out through said vent. During the the process of filtration in this form of the invention the valve 17 is opened and the valve 7 is closed. Thus the water passes in from pipe 21 through pipe 15 and through the perforations of the globe 33 and up through the stone 3. When it is desired to clean the lower face of the stone, as shown in this form of the invention, it is simply necessary to open the valve 7, and the capacity of the pipe 6 being greater than that of the pipe 15 the water is quickly exhausted from the compartment 5 through the pipe 6, and thus the perforations of the globe 33 project the water in all directions, the major portion of which comes up against the under face of the stone 3. At the same time the weight of water from above operates in the same manner as before described in the form of the invention as shown in Fig. 2. The concavity of the surface 34 has a tendency to direct all the jets up against the under face of the stone 3. The sediment thus loosened is quickly carried away through the waste-pipe 6 into the sewer. In the form of the invention as shown in Fig. 4 an adjustable device is provided for receiving stones of varying thickness. In some localities the water-pressure is very feeble, while in other localities the pressure is very great. Where the pressure is great, it is desirable to use a thick stone, and where the pressure is feeble it is desirable to use a thin stone. Therefore it will be observed that it is desirable to provide a support 38, said support being adapted to be contracted or expanded according to the thickness of the stone. The support 38 consists of the annular ring 39, said ring having on opposite sides the elongated perforations 40, said perforations extending substantially radially from the center describing the ring. The semicircular sections 41 are located on the upper surface of the ring 39. Said sections 41 are also provided with the elongated perforations 42, the said perforations 42 being adapted to register with the perforations 40, the bolts 43 passing perpendicularly through the perforations 42 and 40, the heads of the bolts being countersunk in the sections 41, as shown in Figs. 4 and 4ª. Thus when a thin stone 3 is used the semicircular sections 41 41 are extended, as shown in Fig. 4ª, and the edges of said sections 41 41 will come in contact with the upper portion of the concaved surface 34 of the compartment 5, and thus the stone thereon will be held in position. When a thick stone is used, the sections 41 41 are contracted or drawn together at their ends, and the ring 39 will come in contact with the concaved surface of the bottom of the compartment 5, and thus the stone will be supported. It is obvious that the sections 41 41 may be adjusted on the ring 39 to suit stones of intermediate thickness.

In the form of the invention as shown in Fig. 8 the method of introducing the water to the connecting-face of the stone may be the same as that shown in any of the preceding figures. The form of the device as shown in this figure, as above stated, is especially adapted to be connected to steam-boilers or other generators. In lieu of the faucet 8 the pipe 44 is provided, said pipe having a valve 45, the said pipe being connected to an injector or to a steam-boiler or any other suitable steam-generator or device requiring filtered water.

Having thus described my invention, what I claim as new, and desire to secure by Letters Patent, is—

1. A filter consisting of a receptacle, a supply-pipe connecting with said receptacle, a waste-pipe also connecting with said receptacle, the bottom of the receptacle having a concaved surface, a means for supporting the stone, consisting of an annular ring having opposite elongated perforations, semicircular sections located on said ring, said semicircular sections having elongated perforations adapted to register with the perforations of the ring, and bolts adapted to fix the semicircular sections in their proper relation to the annular ring.

2. In a device of the character described, the combination of a receptacle provided with inclined walls, an expansible support resting on the said inclined walls and a filtering stone or diaphragm mounted on the support, substantially as described.

3. In a filter such as described, means for supporting the filtering stone or diaphragm comprising a ring, and curved sections radially adjustable on said ring, substantially as described.

4. In a filter such as described, means for supporting the filtering stone or diaphragm comprising a ring having radial slots, curved sections having corresponding slots therein and bolts passing through the slots of the ring and curved sections, substantially as described.

5. In combination with a filter of the character described, means located in the feed-pipe for regulating the height of the fluid in the filter, means attached to the feed-pipe for cleaning the filter, and a pipe bridging the regulating means for use during the cleaning operation, substantially as described.

In testimony whereof I affix my signature in presence of two witnesses.

GEORGE G. SCHROEDER.

Witnesses:
JOHN L. HEBB,
GEORGE M. HEWITT.